(12) United States Patent
Toda et al.

(10) Patent No.: US 12,358,843 B2
(45) Date of Patent: Jul. 15, 2025

(54) CUTTING TOOL

(71) Applicant: NTK CUTTING TOOLS CO., LTD., Komaki (JP)

(72) Inventors: Tatsuya Toda, Nagoya (JP); Takuya Furuhashi, Nagoya (JP); Ryoji Toyoda, Nagoya (JP)

(73) Assignee: NTK CUTTING TOOLS CO., LTD., Komaki (JP)

(*) Notice: Subject to any disclaimer, the term of this patent is extended or adjusted under 35 U.S.C. 154(b) by 622 days.

(21) Appl. No.: 17/787,031

(22) PCT Filed: Oct. 28, 2020

(86) PCT No.: PCT/JP2020/040346
§ 371 (c)(1),
(2) Date: Jun. 17, 2022

(87) PCT Pub. No.: WO2021/124690
PCT Pub. Date: Jun. 24, 2021

(65) Prior Publication Data
US 2023/0018290 A1    Jan. 19, 2023

(30) Foreign Application Priority Data
Dec. 20, 2019  (JP) ................................ 2019-230148

(51) Int. Cl.
*C04B 35/597* (2006.01)
*B23B 27/14* (2006.01)
(Continued)

(52) U.S. Cl.
CPC .......... *C04B 35/597* (2013.01); *B23B 27/148* (2013.01); *C04B 35/6261* (2013.01);
(Continued)

(58) Field of Classification Search
None
See application file for complete search history.

(56) References Cited

U.S. PATENT DOCUMENTS 4,699,890 A * 10/1987 Matsui .................. C04B 35/584
501/97.3
5,316,856 A * 5/1994 Suzuki .................. C04B 35/597
501/126
(Continued)

FOREIGN PATENT DOCUMENTS

EP    514622 A1 * 11/1992    ......... C04B 35/5935
EP   1043292 A1 * 10/2000    ........... C04B 35/584
(Continued)

OTHER PUBLICATIONS

International Search Report for PCT/JP2020/040346 dated, Dec. 28, 2020 (PCT/ISA/210).

*Primary Examiner* — Seth Dumbris
(74) *Attorney, Agent, or Firm* — Sughrue Mion, PLLC (57) ABSTRACT

A cutting tool (1) formed of a silicon nitride-based sintered body (2) including a matrix phase (3), a hard phase (4), and a grain boundary phase (10) in which a glass phase (11) and a crystal phase (12) exist. The sintered body (2) contains yttrium in an amount of 5.0 wt % to 15.0 wt % in terms of an oxide, and contains titanium nitride as the hard phase (4) in an amount of 5.0 wt % to 25.0 wt %. In an X-ray diffraction peak, a halo pattern appears at 2θ ranging from 25° to 35° in an internal region of the sintered body (2). A ratio B/A of a maximum peak intensity B to a maximum peak intensity A satisfies 0.11≤B/A≤0.40 . . . Expression (1) in a surface region of the sintered body (2), and satisfies 0.00≤B/A≤0.10 . . . Expression (2) in the internal region of the sintered body (2).

4 Claims, 5 Drawing Sheets

(51) Int. Cl.
*C04B 35/626* (2006.01)
*C04B 35/638* (2006.01)
*C04B 35/64* (2006.01)

(52) U.S. Cl.
CPC ...... *C04B 35/62695* (2013.01); *C04B 35/638* (2013.01); *C04B 35/64* (2013.01); C04B 2235/3225 (2013.01); C04B 2235/3869 (2013.01); C04B 2235/3886 (2013.01); C04B 2235/5445 (2013.01); C04B 2235/604 (2013.01); C04B 2235/6562 (2013.01); C04B 2235/6567 (2013.01); C04B 2235/658 (2013.01); C04B 2235/87 (2013.01)

(56) References Cited

U.S. PATENT DOCUMENTS

| | | | |
|---|---|---|---|
| 2008/0167174 A1* | 7/2008 | Osthols | C04B 41/009 501/98.1 |
| 2017/0334790 A1* | 11/2017 | Chun | C04B 35/62655 |

FOREIGN PATENT DOCUMENTS

| | | |
|---|---|---|
| JP | 2-275763 A | 11/1990 |
| JP | 2000-354901 A | 12/2000 |
| JP | 2005-231928 A | 9/2005 |

\* cited by examiner

CUTTING TOOL

CROSS REFERENCE TO RELATED APPLICATIONS

This application is a National Stage of International Application No. PCT/JP2020/040346 dated Oct. 28, 2020, claiming priority based on Japanese Patent Application No. 2019-230148 filed Dec. 20, 2019.

TECHNICAL FIELD

The present invention relates to a cutting tool.

BACKGROUND ART

Patent Document 1 discloses a cutting tool that contains silicon nitride as a matrix, and titanium nitride, alumina, and yttria. It is indicated that, in the cutting tool, the matrix formed of silicon nitride contains titanium nitride having excellent thermal conductivity and a low frictional coefficient to form a composite product, thereby obtaining an effect of enhancing wear resistance. Such a cutting tool is frequently used under a severe condition of, for example, high-speed machining in which heat is likely to be generated.

Patent Document 2 discloses a cutting tool in which, one or more selected from carbides, nitrides, oxides, carbonitrides, and oxynitrides of Ti is contained in a Sialon sintered body having, as a main phase, a Sialon phase formed of β-Sialon (SiAlON) and α-Sialon or a Sialon phase formed of β-Sialon, and having a sintering additive added thereto. It is indicated that a titanium compound has a lower reactivity to iron or carbon that is a main component of a workpiece, as compared with silicon nitride, and reaction to the workpiece can be thus inhibited by adding a titanium compound in silicon nitride. Such a cutting tool is frequently used as a material for machining a super heat-resistant alloy.

PRIOR ART DOCUMENT

Patent Document

Patent Document 1: Japanese Patent Application Laid-Open (kokai) No. 2000-354901
Patent Document 2: Japanese Patent Application Laid-Open (kokai) No. 2005-231928

SUMMARY OF THE INVENTION

Problem to be Solved by the Invention

In recent years, a cutting tool has been required to perform highly efficient machining and have a further elongated tool lifespan. A technique for enhancing fracture resistance has been examined in order to elongate the tool lifespan. However, in the techniques having been examined to date, there is room for examining fracture resistance in, for example, machining such as wet machining in which a temperature of a cutting edge is unlikely to be increased.

The present invention has been made in view of the aforementioned circumstances, and an object of the present invention is to enhance fracture resistance. The present invention can be implemented in the following modes.

Means for Solving the Problem

[1] A cutting tool formed of a silicon nitride-based sintered body that includes a matrix phase formed of silicon nitride or Sialon, a hard phase, and a grain boundary phase in which a glass phase and a crystal phase exist, in which
the silicon nitride-based sintered body
contains yttrium such that a content of the yttrium is not less than 5.0 wt % and not greater than 15.0 wt % in terms of an oxide, and contains titanium nitride as the hard phase such that a content of the titanium nitride is not less than 5.0 wt % and not greater than 25.0 wt %,
in an X-ray diffraction peak of the silicon nitride-based sintered body,
a halo pattern appears at 2θ ranging from 25° to 35° in an internal region that is deep from a surface of the silicon nitride-based sintered body by a distance of greater than 1.0 mm, and
regarding a maximum peak intensity A of the matrix phase and a maximum peak intensity B of the crystal phase in the grain boundary phase as defined below, a ratio B/A of the maximum peak intensity B to the maximum peak intensity A
satisfies a relationship represented by Expression (1) in a surface region distant from the surface of the silicon nitride-based sintered body by 0.2 mm or less, and
satisfies a relationship represented by Expression (2) in the internal region of the silicon nitride-based sintered body, $0.11 \leq B/A \leq 0.40$      Expression (1)

$0.00 \leq B/A \leq 0.10$      Expression (2), when the matrix phase is formed of a single kind of phase, the maximum peak intensity A is obtained as a maximum peak intensity of the phase, and, when the matrix phase is formed of a plurality of kinds of phases, the maximum peak intensity A is obtained as a sum of maximum peak intensities of the respective phases, and
when the crystal phase in the grain boundary phase is formed of a single kind of phase, the maximum peak intensity B is obtained as a maximum peak intensity of the phase, and, when the crystal phase in the grain boundary phase is formed of a plurality of kinds of phases, the maximum peak intensity B is obtained as a sum of maximum peak intensities of the respective phases.

[2] The cutting tool according to [1], in which
when a cross-section of the silicon nitride-based sintered body is observed,
in the surface region of the silicon nitride-based sintered body, a proportion Cs of an area occupied by the grain boundary phase is not less than 7.0 area % and not greater than 14.0 area % when an area of an entire visual field is 100 area %,
in the internal region of the silicon nitride-based sintered body, a proportion Ci of an area occupied by the grain boundary phase is not less than 3.0 area % and not greater than 9.0 area % when an area of an entire visual field is 100 area %, and
a relationship represented by Expression (3) is satisfied.

$Cs > Ci$      Expression (3)

[3] The cutting tool according to [1] or [2], in which
when a cross-section of the silicon nitride-based sintered body is observed,
a proportion of a number of particles having a maximum diameter of not greater than 0.5 μm among entire particles of the silicon nitride or the Sialon is not less than 50%, and a proportion of a number of particles having an aspect ratio of not less than 1.5 among particles, of the silicon nitride or the Sialon, having a minimum diameter of not less than 0.5 μm is not less than 55%.

[4] The cutting tool according to any one of [1] to [3], in which a halo pattern does not appear at 2θ ranging from 25° to 35° in an X-ray diffraction peak of the surface region of the silicon nitride-based sintered body.

Advantageous Effects of the Invention

The ceramics sintered body according to the present invention has excellent fracture resistance.

In a case where a proportion of an area occupied by the grain boundary phase satisfies specific requirements, the ceramics sintered body according to the present invention has more excellent fracture resistance.

In a case where the form of particles of silicon nitride or Sialon satisfies specific requirements, the ceramics sintered body according to the present invention has more excellent fracture resistance.

In a case where specific requirements are satisfied in the surface region, the ceramics sintered body according to the present invention can enhance wear resistance in addition to fracture resistance.

MODES FOR CARRYING OUT THE INVENTION

The present invention will be described below in detail. In the description herein, when "to" is used to describe a numerical value range, the lower limit value and the upper limit value are included unless otherwise specified. For example, when "10 to 20" is described, "10" as the lower limit value and "20" as the upper limit value are both included. That is, "10 to 20" is equivalent to "not less than 10 and not greater than 20".

1. Cutting Tool 1

A cutting tool 1 is formed of a silicon nitride-based sintered body 2 that includes a matrix phase 3 formed of silicon nitride ($Si_3N_4$) or Sialon (SiAlON), a hard phase 4, and a grain boundary phase 10 in which a glass phase 11 and a crystal phase 12 exist.

The silicon nitride-based sintered body 2 contains yttrium such that the content of the yttrium is not less than 5.0 wt % and not greater than 15.0 wt % in terms of an oxide, and contains titanium nitride as the hard phase 4 such that the content of the titanium nitride is not less than 5.0 wt % and not greater than 25.0 wt %. In an X-ray diffraction peak of the silicon nitride-based sintered body 2, a halo pattern appears at 2θ ranging from 25° to 35° in an internal region that is deep from the surface of the silicon nitride-based sintered body 2 by a distance of greater than 1.0 mm. In the silicon nitride-based sintered body 2, regarding a maximum peak intensity A of the matrix phase 3 and a maximum peak intensity B of the crystal phase 12 in the grain boundary phase 10 as defined below, a ratio B/A of the maximum peak intensity B to the maximum peak intensity A satisfies a relationship represented by the following Expression (1) in a surface region distant from the surface of the silicon nitride-based sintered body 2 by 0.2 mm or less, and the ratio B/A satisfies a relationship represented by the following Expression (2) in the internal region of the silicon nitride-based sintered body 2.

$0.11 \leq B/A \leq 0.40$  Expression (1)

$0.00 \leq B/A < 0.10$  Expression (2)

In a case where the matrix phase 3 is formed of a single kind of phase, the maximum peak intensity A is obtained as a maximum peak intensity of the phase. In a case where the matrix phase 3 is formed of a plurality of kinds of phases, the maximum peak intensity A is obtained as a sum of maximum peak intensities of the respective phases.

In a case where the crystal phase 12 in the grain boundary phase 10 is formed of a single kind of phase, the maximum peak intensity B is obtained as a maximum peak intensity of the phase. In a case where the crystal phase 12 in the grain boundary phase 10 is formed of a plurality of kinds of phases, the maximum peak intensity B is obtained as a sum of maximum peak intensities of the respective phases.

2. Silicon Nitride-Based Sintered Body 2

(1) Phase Structure of the Silicon Nitride-Based Sintered Body 2

Figure 1:
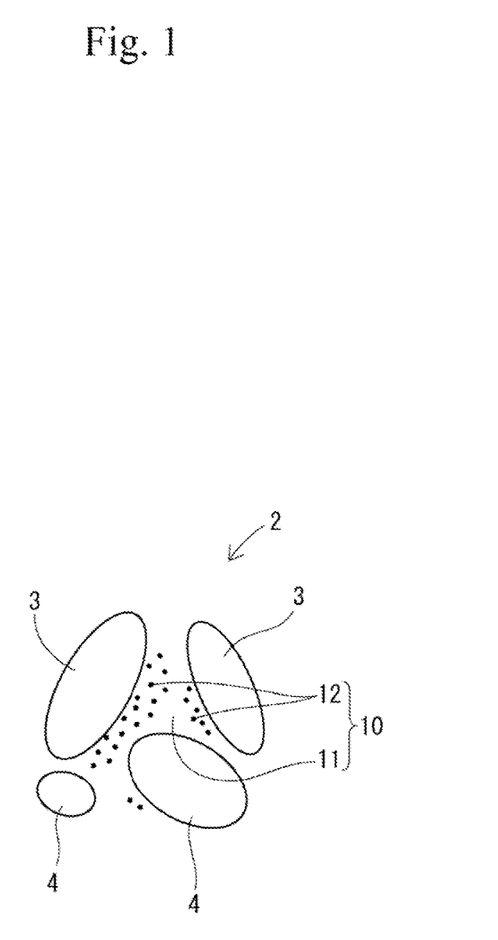
FIG. 1 Schematic diagram illustrating a state of each of phases contained in a silicon nitride-based sintered body.

The silicon nitride-based sintered body 2 includes the grain boundary phase 10 between the matrix phase 3 and the hard phase 4 as schematically shown in FIG. 1. The matrix phase 3 is formed of silicon nitride or Sialon. The silicon nitride or Sialon may be any of α phase, β phase, a polytype, and a combination thereof. The glass phase 11 and the crystal phase 12 exist in the grain boundary phase 10. FIG. 1 conceptually shows each phase and does not necessarily show the shape and the size of each phase correctly.

(2) Components Contained in the Silicon Nitride-Based Sintered Body 2 and a Content of Each Component A content of yttrium is not less than 5.0 wt % in terms of an oxide from the viewpoint of obtaining a densified sintered body. The content of yttrium is not greater than 15.0 wt % in terms of an oxide from the viewpoint of reducing an amount of the crystal phase 12 in the grain boundary phase 10. Therefore, the content of yttrium is not less than 5.0 wt % and not greater than 15.0 wt % in terms of an oxide.

A content of titanium nitride as the hard phase 4 is not less than 5.0 wt % from the viewpoint of sufficiently obtaining wear resistance and enhancing resistance to chemical reaction of the silicon nitride-based sintered body 2. The resistance to chemical reaction of the silicon nitride-based sintered body 2 is enhanced because titanium nitride has lower reactivity to a workpiece as compared with silicon nitride or Sialon of the matrix phase 3. The content of titanium nitride as the hard phase 4 is not greater than 25.0 wt % from the viewpoint of promoting growth of particles of the matrix phase 3. Therefore, the content of titanium nitride as the hard phase 4 is not less than 5.0 wt % and not greater than 25.0 wt % in terms of an oxide.

The content (wt %) of each component can be obtained as a blending amount of the component in the case of the weight of the silicon nitride-based sintered body 2 being 100 wt %.

Contents of the other components of the silicon nitride-based sintered body 2 are not particularly limited. The silicon nitride-based sintered body 2 may contain aluminium such that the content of the aluminium is not less than 3.0 wt % and not greater than 10.0 wt % in terms of an oxide. In a case where the content of aluminium is not less than 3.0 wt % in terms of an oxide, reactivity to a workpiece can be reduced. In a case where the content of aluminium is not greater than 10.0 wt % in terms of an oxide, wear resistance can be enhanced without lowering a strength of the matrix phase.

In a case where the silicon nitride-based sintered body 2 is formed merely of silicon nitride or Sialon, yttria ($Y_2O_3$), alumina ($Al_2O_3$), titanium nitride (TiN), and inevitable impurities, the content of silicon nitride or Sialon is a remainder of the total (wt %) of contents of titanium nitride, alumina, yttria, and the inevitable impurities. The content of the inevitable impurities may be not greater than 0.1 wt %.

(3) Requirements about Halo Pattern in the Internal Region

The silicon nitride-based sintered body 2 exhibits a halo pattern in the internal region that is deep from the surface of the silicon nitride-based sintered body 2 by a distance of greater than 1.0 mm at 2θ ranging from 25° to 35°. In this configuration, fracture resistance can be substantially enhanced. Although the reason is unclear, the inferred reason will be described below.

Figure 3:
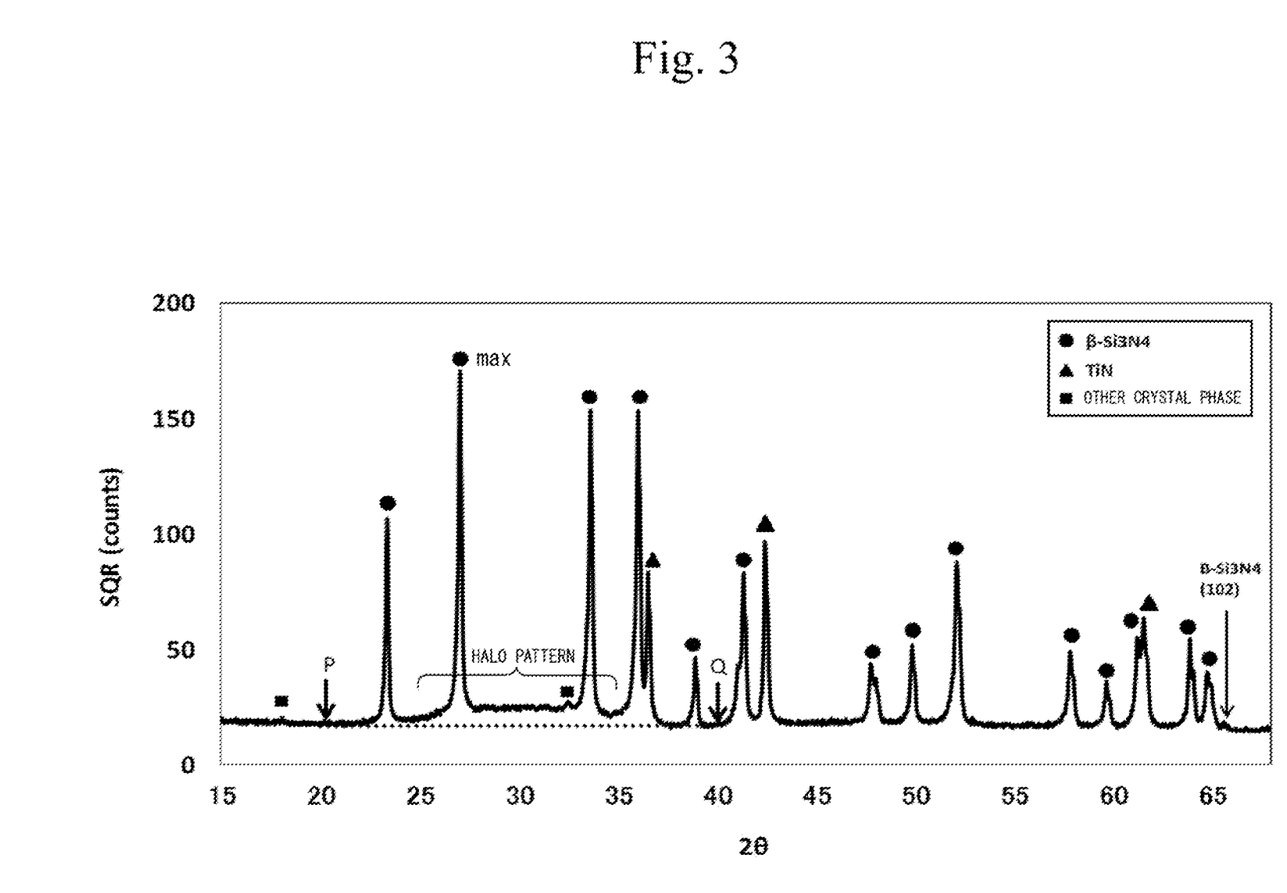
FIG. 3 Diagram illustrating an X-ray diffraction pattern in an internal region in experimental example 1.

Whether the halo pattern is present or absent is determined according to whether or not the X-ray diffraction pattern has a broad pattern in a range of 2θ from 25° to 35°. Specifically, as shown in FIG. 3, in a case where the minimum value of the X-ray diffraction intensity in a range of 2θ from 25° to 35° indicates a value above a line segment PQ connecting between a point P at which the intensity is the lowest at 2θ of not greater than 20° and a point Q at which the intensity is the lowest at 2θ of not less than 40°, the halo pattern is determined to be present. That is, whether the halo pattern is present or absent is determined according to whether or not a broad pattern indicating a high intensity above the line segment PQ as an imaginary base line appears at 2θ ranging from 25° to 35°. Appearance of such a halo pattern can be an index indicating that the glass phase 11 exists in the grain boundary phase 10 in the internal region of the silicon nitride-based sintered body 2.

The maximum intensity value of the halo pattern is preferably greater than a peak intensity value at which a reference diffraction intensity is 1.0 on a (h, k, l) plane in the JCPDS card of the matrix phase 3 to be referred to. This will be specifically described with reference to FIG. 3. As shown in FIG. 3, the maximum intensity value of the halo pattern represents an intensity at a portion having the highest intensity in portions other than peaks of the crystal phase in an X-ray diffraction curve, and appears near 2θ of 30°. The peak at which the reference diffraction intensity of the matrix phase 3 to be referred to is 1.0 is a peak on the (102) plane in JCPDS card:#00-033-1160 of silicon nitride β phase (β-$Si_3N_4$), and appears near 2θ of 65° indicated by an arrow in FIG. 3. Comparison between these intensities indicates that the maximum intensity value of the halo pattern appearing near 2θ of 30° is higher than the peak intensity on the (102) plane of silicon nitride β phase (β-$Si_3N_4$). In a case where peaks of a plurality of crystal phases are present at the peak intensity on the (102) plane, a peak intensity at which another reference diffraction intensity on the (420) plane, the (112) plane, or the like is 1.0, can be referred to.

The cutting tool 1 that satisfies the requirements about the halo pattern in the internal region can be obtained by controlling blending amounts of materials of the grain boundary phase 10, a sintering condition for manufacturing the silicon nitride-based sintered body 2, and the like.

(4) Requirements about a Ratio in Maximum Peak Intensity Between the Matrix Phase 3 and the Crystal Phase 12 in the Grain Boundary Phase 10

In the silicon nitride-based sintered body 2, a ratio B/A of the maximum peak intensity B of the crystal phase 12 in the grain boundary phase 10 to the maximum peak intensity A of the matrix phase 3 satisfies a relationship of $0.11 \leq B/A \leq 0.40$ in the surface region and satisfies a relationship of $0.00 \leq B/A < 0.10$ in the internal region of the silicon nitride-based sintered body 2. In this configuration, fracture resistance of the silicon nitride-based sintered body 2 can be enhanced while wear resistance of the silicon nitride-based sintered body 2 is assured. Although the reason is unclear, the inferred reason will be described below.

The ratio B/A of the maximum peak intensity B to the maximum peak intensity A is obtained as follows. As in the X-ray diffraction pattern shown in FIG. 3, in a case where the matrix phase 3 is formed of one kind of a phase that is the silicon nitride β phase indicated by round marks, the maximum peak intensity A is obtained as the maximum peak intensity of the phase. In the X-ray diffraction pattern shown in FIG. 3, a peak appearing between 2θ of 25° and 2θ of 30° is the maximum peak of the silicon nitride β phase, and the intensity at the peak is specified as the maximum peak intensity A. Examples of the matrix phase 3 include a silicon nitride α phase, a silicon nitride β phase, a Sialon α phase, a Sialon β phase, a polytype 12H, a polytype 21R, and a polytype 15R. For these matrix phases 3, the JCPDS card to be referred to and the crystal plane that indicates the maximum peak and is adopted in principle are as follows. For the silicon nitride α phase, the JCPDS card:#00-009-0250 is referred to and the peak intensity on the (210) plane is adopted as the maximum peak intensity in principle. For the silicon nitride β phase, the JCPDS card:#00-033-1160 is referred to and the peak intensity on the (200) plane is adopted as the maximum peak intensity in principle. For the Sialon α phase, the JCPDS card:#00-042-0251 is referred to and the peak intensity on the (102) plane is adopted as the maximum peak intensity in principle. For the Sialon β phase, the JCPDS card:#00-048-1615 is referred to and the peak intensity on the (200) plane is adopted as the maximum peak intensity in principle. For the polytype 12H, the JCPDS card:#00-042-0161 is referred to and the peak intensity on the (110) plane is adopted as the maximum peak intensity in principle. For the polytype 21R, the JCPDS card:#00-053-1012 is referred to and the peak intensity on the (101) plane is adopted as the maximum peak intensity in principle. For the polytype 15R, the JCPDS card:#00-042-0160 is referred to and the peak intensity on the (101) plane is adopted as the maximum peak intensity in principle.

In a case where the maximum peak value of the crystal phase to be referred to overlaps a peak of another crystal phase, a peak value that has the highest intensity in non-overlapping peaks is selected and a theoretical intensity value is set as the maximum peak intensity from the reference diffraction intensity, on the (h,k,l) plane, corresponding to the peak to calculate each peak intensity ratio. Specifically, in a case where I represents the selected peak intensity and Io represents the reference diffraction intensity, on the (h,k,l) plane, corresponding to the peak, the reference value X is represented by the following expression.

$$X = I/Io * 100$$

As in the X-ray diffraction pattern shown in FIG. 3, in a case where the crystal phase 12 in the grain boundary phase 10 is formed of one kind of another crystal phase indicated by squares, the maximum peak intensity B is obtained as the maximum peak intensity of the phase. In FIG. 3, a peak appearing between 2θ of 30° and 2θ of 35° is the maximum peak of the crystal phase 12 in the grain boundary phase 10, and the intensity at the peak is specified as the maximum peak intensity B. Examples of the crystal phase 12 in the grain boundary phase 10 include $Y_2SiAlO_5N$, $Y_4SiAlO_8N$, $Y_3AlSi_2O_7N_2$, $Y_{10}(Si_6O_{22}N_2)O_2$, and $YSiO_2N$. For the crystal phase 12, the JCPDS card to be referred to and the crystal plane that indicates the maximum peak and that is adopted in principle are as follows. For $Y_2SiAlO_5N$, the JCPDS card:#00-048-1627 is referred to and the peak intensity on the (102) plane is adopted as the maximum peak intensity in principle. For $Y_4SiAlO_8N$, JCPDS card:#00-048-1630 is referred to and the peak intensity on the (201) plane is adopted as the maximum peak intensity in principle. For $Y_3AlSi_2O_7N_2$, the JCPDS card:#00-043-0579 is referred to and the peak intensity on the (100) plane is adopted as the maximum peak intensity in principle. For $Y_{10}(Si_6O_{22}N_2)O_2$, the JCPDS card: #01-083-6656 is referred to and the peak intensity on the (211) plane is adopted as the maximum peak intensity in principle. For $YSiO_2N$, the JCPDS card:#00-048-1624 is referred to and the peak intensity on the (20-4) plane is adopted as the maximum peak intensity in principle. For Miller indices, although the direction having a negative component is generally represented by placing a bar above the number, the bar is indicated so as to be aligned with the number for convenience sake in the description herein. For example, it is described as "(20-4)" as above. In this case, the third number "-4" is equivalent to "4" with a "bar" thereabove.

Figure 4:
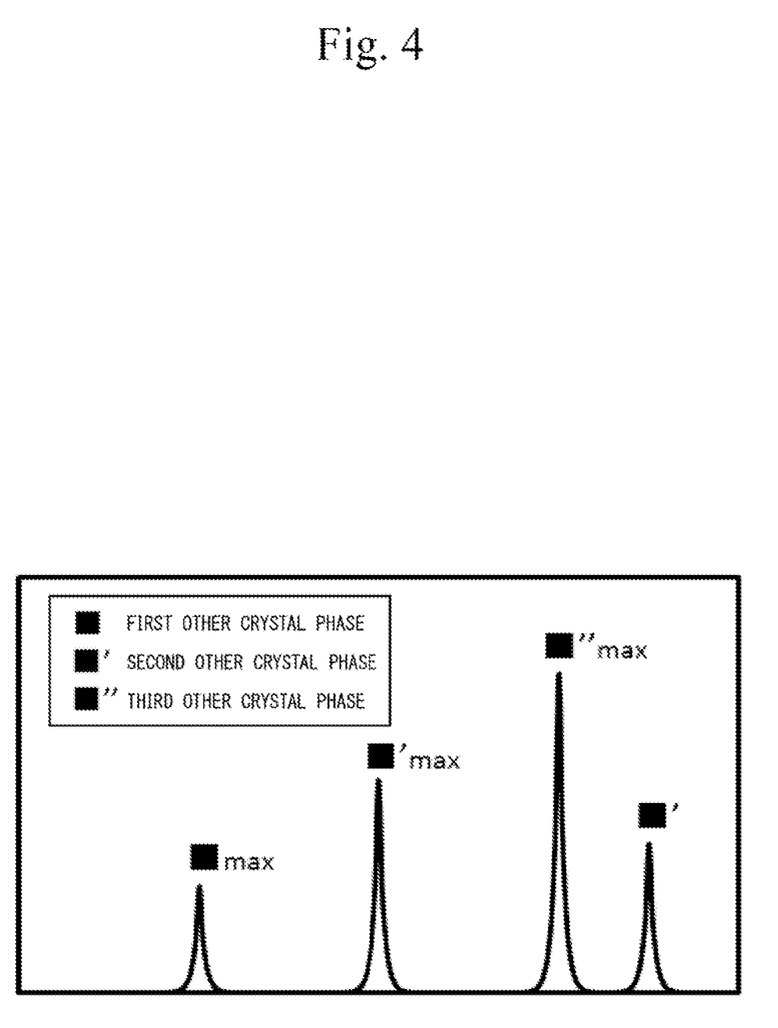
FIG. 4 Schematic diagram illustrating an X-ray diffraction pattern in a case where a crystal phase in a grain boundary phase is formed of a plurality of kinds of phases.

In a case where the crystal phase 12 in the grain boundary phase 10 is formed of a plurality of kinds of phases, the maximum peak intensity B is obtained as a sum of the maximum peak intensities of the respective phases. The method for obtaining the sum will be described with reference to FIG. 4. In FIG. 4, a square mark represents a first other crystal phase. The prime square mark represents a second other crystal phase that is a crystal phase different from the first other crystal phase. The double prime square mark represents a third other crystal phase that is a crystal phase different from the first other crystal phase and the second other crystal phase. For the marks in FIG. 4, the peak indicated by "max" is the maximum peak of the phase. For example, in FIG. 4, although two peaks of the second other crystal phase indicated by the prime square marks are recognized, the left-side peak indicating the highest intensity is the maximum peak of the second other crystal phase. In such an X-ray diffraction pattern, the maximum peak intensity B is obtained as a sum of the maximum peak intensity of the first other crystal phase indicated by the max square, the maximum peak intensity of the second other crystal phase indicated by the prime max square, and the maximum peak intensity of the third other crystal phase indicated by the double prime max square.

In a case where the matrix phase 3 is formed of a plurality of kinds of phases, the maximum peak intensity A is obtained as a sum of the maximum peak intensities of the respective phases, as in the case where the crystal phase 12 in the grain boundary phase 10 is formed of a plurality of kinds of phases.

The cutting tool 1 that satisfies the requirements about the ratio in the maximum peak intensity between the matrix phase 3 and the crystal phase 12 in the grain boundary phase 10 can be obtained by controlling blending amounts of materials of the grain boundary phase 10, a sintering condition for manufacturing the silicon nitride-based sintered body 2, and the like.

(5) Requirements about a Proportion of an Area Occupied by the Grain Boundary Phase 10

In the cutting tool 1, in a case where the cross-section of the silicon nitride-based sintered body 2 is observed, when the area of the entire visual field is 100 area %, a proportion Cs of an area occupied by the grain boundary phase 10 is not less than 7.0 area % and not greater than 14.0 area % in the surface region of the silicon nitride-based sintered body 2, and, when the area of the entire visual field is 100 area %, a proportion Ci of an area occupied by the grain boundary phase 10 is not less than 3.0 area % and not greater than 9.0 area % in the internal region of the silicon nitride-based sintered body 2, and a relationship represented by the following Expression (3) is preferably satisfied.

$$Cs > Ci \qquad \text{Expression (3)}$$

The proportion Cs, Ci of the area occupied by the grain boundary phase 10 is obtained as follows. The cross-section passing through both the surface region and the internal region of the silicon nitride-based sintered body 2 is observed by an SEM (scanning electron microscope), and an SEM image in a range of 24 μm×18 μm is obtained for each of the surface region and the internal region of the silicon nitride-based sintered body 2. The SEM image is binarized by using image processing software WinROOF to identify the grain boundary phase 10 which exists between the matrix phases 3 and the hard phases 4, and the area of the grain boundary phase 10 is calculated. Each of the proportions Cs, Ci of the areas occupied by the grain boundary phase 10 to the area of the entire visual field is obtained.

For each of the surface region and the internal region of the silicon nitride-based sintered body 2, a plurality of SEM images in the range of 24 μm×18 μm are observed and the requirements may be required to be satisfied merely in at least one set of SEM images among the images.

The proportion Cs of the area occupied by the grain boundary phase 10 is preferably not less than 7.0 area % from the viewpoint of enhancing a grain boundary strength. Meanwhile, the proportion Cs of the area occupied by the grain boundary phase 10 is preferably not greater than 14.0 area % from the viewpoint of maintaining wear resistance. Therefore, the proportion Cs of the area occupied by the grain boundary phase 10 is preferably not less than 7.0 area % and not greater than 14.0 area %.

The proportion Ci of the area occupied by the grain boundary phase 10 is preferably not less than 3.0 area % from the viewpoint of maintaining the strength of the silicon nitride-based sintered body 2. Meanwhile, the proportion Ci of the area occupied by the grain boundary phase 10 is preferably not greater than 9.0 area % from the viewpoint of promoting growth of particles of the matrix phase 3. Therefore, the proportion Ci of the area occupied by the grain boundary phase 10 is preferably not less than 3.0 area % and not greater than 9.0 area %.

(6) Requirements about the Form of Particles of Silicon Nitride or Sialon

In the cutting tool 1, in a case where the cross-section of the silicon nitride-based sintered body 2 is observed, a proportion of the number of particles having the maximum diameter of not greater than 0.5 μm among the entire particles of silicon nitride or Sialon is preferably not less than 50%, and a proportion of the number of particles having an aspect ratio of not less than 1.5 among the particles, of silicon nitride or Sialon, having the minimum diameter of not less than 0.5 μm is preferably not less than 55%.

The maximum diameter and the aspect ratio of particles of silicon nitride or Sialon are obtained as follows. The cross-section passing through the internal region of the silicon nitride-based sintered body 2 is observed by an SEM, and an SEM image in a range of 24 μm×18 μm is obtained for the internal region of the silicon nitride-based sintered body 2. The SEM image is subjected to image analysis to examine the maximum diameter X and the minimum diameter Y of each of particles of silicon nitride or Sialon. The aspect ratio (X/Y) of each of the particles of silicon nitride or Sialon is then calculated.

For the silicon nitride-based sintered body 2, a plurality of SEM images in the range of 24 μm×18 μm are observed and the requirements may be required to be satisfied merely in at least one SEM image among the images.

The proportion of the number of particles having the maximum diameter of not greater than 0.5 μm among the entire particles of silicon nitride or Sialon is preferably not less than 50% from the viewpoint of forming the particles of the matrix phase 3 as fine particulates and homogenization. The proportion of the number of particles having the aspect ratio of not less than 1.5 among the particles, of silicon nitride or Sialon, having the minimum diameter of not less than 0.5 μm is preferably not less than 55% and more preferably not less than 60% from the viewpoint of exhibiting a so-called diffraction effect of curving a generated crack.

(7) Requirements about Halo Pattern in the Surface Region

The silicon nitride-based sintered body 2 preferably exhibits no halo pattern at 2θ ranging from 25° to 35° in the surface region distant from the surface by 0.2 mm or less.

The cutting tool 1 that satisfies the requirements about the halo pattern in the surface region can be obtained by controlling blending amounts of materials of the grain boundary phase 10, a sintering condition for manufacturing the silicon nitride-based sintered body 2, and the like. The greater an amount of WC contained in the silicon nitride-based sintered body 2 is, the more easily the surface region of the silicon nitride-based sintered body 2 is sintered, and an amount of the crystal phase in the grain boundary phase tends to be increased, although the detailed reason is unclear.

3. Method for Manufacturing the Silicon Nitride-Based Sintered Body 2

A method for manufacturing the silicon nitride-based sintered body 2 is not particularly limited. An example of the method for manufacturing the silicon nitride-based sintered body 2 will be described below.

(1) Materials

The following material powders are used as the materials.
Silicon nitride powder ($Si_3N_4$ powder)
Aluminium oxide powder ($Al_2O_3$ powder)
Yttrium oxide powder ($Y_2O_3$ powder)
Titanium nitride powder (TiN powder)

(2) Production of Powder for Sintering

The above-described powders are weighed so as to obtain a predetermined blending ratio. The weighed powders are put into a ball mill, and mixed and pulverized with alcohol (for example, ethanol) and a pulverization medium. The obtained slurry is treated so as to be dried with hot water, and dried and mixed powder is obtained.

(3) Press-Forming

The obtained mixed powder is press-formed. The formed product obtained by the press-forming is subjected to cold isostatic pressing (CIP) forming to obtain a formed product.

(4) Sintering

The formed product obtained by the cold isostatic pressing forming is heated at a predetermined temperature in a nitrogen atmosphere in which pressure is set to be reduced, and delipidated. The delipidated formed product is heated at a predetermined temperature in a nitrogen atmosphere and sintered. In the sintering process, two steps of temperature increase conditions, which are first temperature increase and second temperature increase performed subsequent to the first temperature increase, are set. A temperature increase rate in the second temperature increase is preferably higher than that in the first temperature increase. The ambient pressure in the second temperature increase is preferably higher than that in the first temperature increase. After the second temperature increase, the temperature obtained by the temperature increase is maintained for a predetermined time period. Cooling is performed at a predetermined temperature decrease rate to obtain a silicon nitride-based sintered body.

In the sintering, the formed product tends to be sintered more easily near the surface than in the internal portion. Therefore, in the sintering, by setting the first temperature increase and the second temperature increase, the silicon nitride-based sintered body 2 that satisfies the requirements about the halo pattern and the requirements about a ratio in the maximum peak intensity between the matrix phase 3 and the crystal phase 12 in the grain boundary phase 10 can be advantageously obtained. That is, the temperature increase rate is increased to be higher at the second temperature increase for a high temperature region (for example, not lower than 1650° C.) in which the sintering proceeds, than at the first temperature increase for a low temperature region (for example, not higher than 1400° C.), whereby a proportion between the glass phase 11 and the crystal phase 12 in the grain boundary phase 10 can be controlled in the internal region and the surface region of the silicon nitride-based sintered body 2. The second temperature increase is preferably performed, for example, in a condition in which an applied pressure is 0.15 MPa to 0.40 MPa. When an applied pressure is not less than 0.15 MPa in the second temperature increase, sinterability can be sufficiently obtained. When an applied pressure is not higher than 0.40 MPa in the second temperature increase, an amount of the grain boundary phase 10 is assured particularly near the surface of the silicon nitride-based sintered body 2, and the strength of the silicon nitride-based sintered body 2 can be maintained.

4. Other Structures of the Cutting Tool 1

Figure 2:
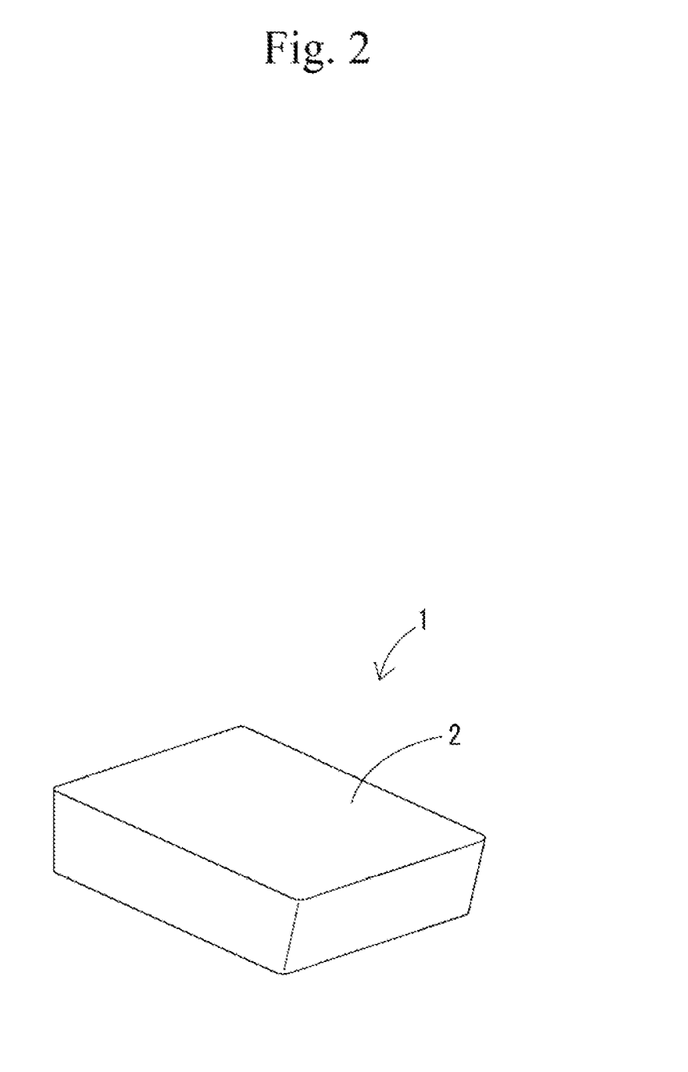
FIG. 2 Schematic perspective view of a cutting tool.

The shape of the cutting tool 1 is not particularly limited. For example, the silicon nitride-based sintered body 2 can be shaped and surface-finished by at least one of machining processes such as cutting, grinding, and polishing, to produce the cutting tool 1 (see FIG. 2). Needless to say, the silicon nitride-based sintered body 2 may be used as the cutting tool 1 as it is.

In the cutting tool 1, the silicon nitride-based sintered body 2 may be used as a base, and a surface-coating layer formed of at least one compound selected from carbides, nitrides, oxides, carbonitrides, carbonates, oxynitrides, and oxycarbonitrides of titanium, chromium, and aluminium may be formed on the surface of the base.

By forming the surface-coating layer, the surface hardness of the cutting tool 1 is enhanced and progress of wear caused by reaction and welding to a workpiece is inhibited. As a result, wear resistance of the cutting tool 1 is enhanced.

Preferable examples of the at least one compound selected from carbides, nitrides, oxides, carbonitrides, carbonates, oxynitrides, and oxycarbonitrides of titanium, chromium, and aluminium include, but are not particularly limited to, TiN, TiAlN, TiAlCrN, and AlCrN.

The thickness of the surface-coating layer is not particularly limited. The thickness of the surface-coating layer is preferably not less than 0.02 µm and not greater than 30 µm from the viewpoint of wear resistance.

5. Inferred Reason why Fracture Resistance is Excellent

The inferred reason why the cutting tool 1 of the present disclosure has excellent fracture resistance will be described.

The silicon nitride-based sintered body 2 contains yttrium such that the content of the yttrium is not less than 5.0 wt % in terms of an oxide, whereby sinterability is assured. Meanwhile, the silicon nitride-based sintered body 2 contains yttrium such that the content of the yttrium is not greater than 15.0 wt % in terms of an oxide, whereby an amount of the crystal phase 12 in the grain boundary phase 10 was able to be reduced to be not greater than a predetermined amount.

The silicon nitride-based sintered body 2 contains titanium nitride as the hard phase 4 such that the content of the titanium nitride is not less than 5.0 wt %, whereby sinterability can be enhanced to reduce internal pores. Moreover, the content of the titanium nitride is not less than 5.0 wt %, whereby an effect of enhancing resistance to chemical reaction of the silicon nitride-based sintered body 2 is exhibited. Meanwhile, the silicon nitride-based sintered body 2 contains titanium nitride as the hard phase 4 such that the content of the titanium nitride is not greater than 25 wt %, whereby growth of particles of the matrix phase 3 is unlikely to be inhibited by titanium nitride particles and the particles of the matrix phase 3 can grow to be needle-shaped.

Furthermore, in the silicon nitride-based sintered body 2, the glass phase 11 and the crystal phase 12 are in the grain boundary phase 10, and an amount of the crystal phase 12 in the grain boundary phase 10 relative to the matrix phase 3 is controlled in the surface region and the internal region as described above, whereby it is considered that progress of thermal crack generated at the surface in the cutting process was able to be inhibited. It is inferred that contribution thereto is made by an effect of enhancing grain boundary strength since a predetermined amount of the glass phase 11 exists in the internal region of the silicon nitride-based sintered body 2. Next, an action by heat in the cutting process will be considered. In the surface region of the silicon nitride-based sintered body 2, the temperature tends to become high due to heat generated by contact between a workpiece and the cutting tool 1. Therefore, the surface region of the silicon nitride-based sintered body 2 contains a large amount of the crystal phase 12 having excellent high temperature strength also in the grain boundary phase 10, whereby wear resistance and fracture resistance are likely to be assured. Meanwhile, the temperature in the internal region of the silicon nitride-based sintered body 2 is less likely to be increased as compared with that in the surface region. This is significant in machining, in which heat is not generated so much, such as wet rough machining for a heat-resistant alloy. Therefore, it is inferred that the internal region of the silicon nitride-based sintered body 2 contains a large amount of the glass phase 11 having more excellent strength at room temperature to an intermediate temperature in the grain boundary phase 10, thereby contributing to enhancement of fracture resistance. Thus, the cutting tool 1 of the present embodiment has excellent fracture resistance while assuring wear resistance since an amount of the glass phase 11 in the grain boundary phase 10 is larger in the internal region of the silicon nitride-based sintered body 2 than in the surface region thereof. The cutting tool 1 formed of the silicon nitride-based sintered body 2 having such a structure can have a long lifespan.

In a case where the requirements about the proportion of the area occupied by the grain boundary phase 10 as described above are satisfied, it is inferred that the fracture resistance is enhanced as follows.

Since an amount of the crystal phase 12 having excellent thermal characteristics in the grain boundary phase 10 is large in the surface region of the silicon nitride-based sintered body 2, wear resistance can be maintained by making the proportion $Cs$ of the area of the grain boundary phase 10 appropriate. At this time, when the proportion $Cs$ of the area of the grain boundary phase 10 is not less than 7.0 area % and not greater than 14 area %, grain boundary strength is maintained, so that both wear resistance and fracture resistance can be exhibited. Meanwhile, it is inferred that, since the glass phase 11 having excellent strength at room temperature to an intermediate temperature is contained in the grain boundary phase 10 in the internal region of the silicon nitride-based sintered body 2, abrupt fracture is unlikely to occur even when the proportion $Ci$ of the area of the grain boundary phase 10 is reduced to be less than the proportion in the surface region. Furthermore, the proportion $Ci$ of the area occupied by the grain boundary phase 10 is less than the proportion $Cs$ of the area occupied by the grain boundary phase 10, that is, the proportion of particles of the matrix phase 3 is greater in the internal region of the silicon nitride-based sintered body 2 than in the surface region thereof, whereby the thermal crack generated at the surface of the silicon nitride-based sintered body 2 is inhibited from being transmitted into the internal portion. At this time, when the proportion $Ci$ of the area of the grain boundary phase 10 is not less than 3.0 area % and not greater than 9.0 area %, growth of particles of the matrix phase 3 can be sufficiently promoted while the strength of the silicon nitride-based sintered body 2 is maintained.

In a case where requirements about the aspect ratio of particles of silicon nitride or Sialon as described above are satisfied, it is inferred that fracture resistance is enhanced as follows. When the proportion of particles having the maximum diameter of not greater than 0.5 µm among the entire particles of silicon nitride or Sialon is not less than 50%, the particles of the matrix phase 3 can be formed as fine particulates and homogenized, and the binding size between the fine particulates is reduced, thereby enhancing strength. Furthermore, when the proportion of the particles having the minimum diameter of not less than 0.5 µm and the aspect ratio of not less than 1.5 is not less than 55%, a so-called diffraction effect of curving a crack generated in the silicon nitride-based sintered body 2 is enhanced.

In a case where the requirements about the halo pattern in the surface region as described above are satisfied, it is inferred that wear resistance is enhanced as follows. Since a halo pattern does not appear at 2θ ranging from 25° to 35° in an X-ray diffraction peak of the surface region of the silicon nitride-based sintered body 2, the grain boundary phase 10 does not contain a glass phase that is easily softened at a high temperature, in the surface region of the silicon nitride-based sintered body 2. Therefore, wear resistance of the silicon nitride-based sintered body 2 is further enhanced, and damage is unlikely to occur in the surface region or the generated damage is unlikely to progress. The cutting tool 1 formed of the silicon nitride-based sintered body 2 having such a structure can have a long lifespan.

Thus, in the present embodiment, it is inferred that a predetermined amount of the glass phase 11 is in the internal region while the grain boundary phase 10 in the surface region of the cutting tool 1 is crystallized, whereby strength in the internal region can be enhanced while wear resistance and fracture resistance are maintained in a cutting edge of the cutting tool 1 at which the temperature becomes highest. Particularly, fracture such as flaking is inhibited from occurring in machining, in which the temperature does not become so high in the cutting process, such as wet rough machining during the machining for a super heat-resistant alloy, whereby an effect of elongating a tool lifespan is expected.

EXAMPLE

In the following experiment, silicon nitride-based sintered bodies of experimental examples 1 to 21 were produced and the silicon nitride-based sintered bodies were processed to produce cutting tools of experimental examples 1 to 21. Experimental examples 1 to 12 correspond to examples and experimental examples 13 to 21 correspond to comparative examples.

1. Production of Ceramics Sintered Body
(1) Blending

A blending ratio of material powders used for the ceramics sintered body according to each of the examples and the comparative examples is indicated in Table 1.
The material powders were as follows.
$Si_3N_4$ powder: average particle diameter of not greater than 1.0 μm
$Y_2O_3$ powder: average particle diameter of 3.0 μm
$Al_2O_3$ powder: average particle diameter of 0.4 μm
TiN powder: average particle diameter of 0.5 μm to 2.0 μm The TiN powder contained about 0.1 to 2.0 wt % of WC (tungsten carbide). The content of the WC was less than 0.1 wt % when the total mass of the above-described four kinds of powders was 100.0 wt %. Therefore, in Table 1, the content of the WC is regarded as 0, and the blending ratio of the above-described four kinds of powders is indicated.

TABLE 1

| Experimental example | Composition (wt %) | | | | Halo pattern in internal region | X-ray intensity ratio (B/A) | | Grain boundary phase amount (area %) | | Form of silicon nitride particles (%) Proportion of particles having maximum diameter of not greater than 0.5 μm |
|---|---|---|---|---|---|---|---|---|---|---|
| | $Si_3N_4$ | $Y_2O_3$ | $Al_2O_3$ | TiN | | Surface | Internal region | Surface | Internal region | |
| Expt. Ex. 1 | 78.4 | 7.3 | 4.8 | 9.5 | Present | 0.216 | 0.027 | 8.4 | 4.5 | 65.7 |
| Expt. Ex. 2 | 66.6 | 10.4 | 7.1 | 15.9 | Present | 0.309 | 0.073 | 9.4 | 6.5 | 57.2 |
| Expt. Ex. 3 | 76.7 | 7.4 | 5.5 | 10.4 | Present | 0.192 | 0.059 | 8.1 | 6.6 | 55.9 |
| Expt. Ex. 4 | 77.7 | 8.2 | 4.7 | 9.4 | Present | 0.116 | 0.022 | 9.7 | 3.2 | 50.6 |
| Expt. Ex. 5 | 80.7 | 5.2 | 9.0 | 5.1 | Present | 0.391 | 0.094 | 10.2 | 8.1 | 61.0 |
| Expt. Ex. 6 | 71.0 | 14.9 | 5.6 | 8.5 | Present | 0.292 | 0.085 | 13.8 | 8.9 | 50.9 |
| Expt. Ex. 7 | 67.4 | 5.1 | 3.0 | 24.5 | Present | 0.351 | 0.088 | 7.1 | 6.6 | 52.1 |
| Expt. Ex. 8 | 72.7 | 10.1 | 5.1 | 12.1 | Present | 0.121 | 0.091 | 9.2 | 7.1 | 57.0 |
| Expt. Ex. 9 | 78.8 | 6.9 | 5.0 | 9.3 | Present | 0.191 | 0.035 | 9.8 | 5.8 | 60.1 |
| Expt. Ex. 10 | 76.7 | 7.4 | 5.5 | 10.4 | Present | 0.150 | 0.050 | 11.5 | 5.7 | 49.4 |
| Expt. Ex. 11 | 67.2 | 13.5 | 7.8 | 11.5 | Present | 0.251 | 0.078 | 15.0 | 9.3 | 53.8 |
| Expt. Ex. 12 | 76.8 | 9.5 | 6.5 | 7.2 | Present | 0.275 | 0.061 | 14.2 | 7.5 | 51.4 |
| Expt. Ex. 13 | 81.1 | 4.9 | 3.0 | 11.0 | Deficient sintering | | | | | |
| Expt. Ex. 14 | 69.1 | 15.1 | 6.6 | 9.2 | Present | 0.412 | 0.095 | 14.6 | 8.1 | 49.9 |
| Expt. Ex. 15 | 80.8 | 9.2 | 5.1 | 4.9 | Present | 0.171 | 0.108 | 8.6 | 5.3 | 54.1 |
| Expt. Ex. 16 | 81.1 | 6.3 | 3.5 | 9.1 | Present | 0.098 | 0.065 | 9.2 | 6.6 | 57.1 |
| Expt. Ex. 17 | 82.9 | 7.1 | 3.1 | 6.9 | Absent | 0.191 | 0.089 | 11.1 | 8.9 | 52.2 |
| Expt. Ex. 18 | 71.2 | 11.0 | 2.8 | 15.0 | Absent | 0.251 | 0.213 | 10.8 | 8.8 | 55.3 |
| Expt. Ex. 19 | 66.5 | 10.8 | 6.7 | 16.0 | Absent | 0.157 | 0.397 | 16.2 | 9.1 | 51.9 |
| Expt. Ex. 20 | 78.2 | 7.3 | 4.9 | 9.6 | Absent | 0.146 | 0.085 | 11.8 | 12.8 | 56.0 |
| Expt. Ex. 21 | 60.8 | 9.4 | 2.4 | 27.4 | Present | 0.351 | 0.215 | 15.1 | 7.2 | 57.7 |

| Experimental example | Form of silicon nitride particles (%) Proportion of particles having minimum diameter of not less than 0.5 μm and aspect ratio of not less than 1.5 | Halo pattern in surface region | Cutting performance | | |
|---|---|---|---|---|---|
| | | | The number of times of machining (cycles) | Amount of damage (mm) | State of cutting edge |
| Expt. Ex. 1 | 67.8 | Absent | 10 | 0.21 | Good |
| Expt. Ex. 2 | 60.7 | Absent | 10 | 0.29 | Good |
| Expt. Ex. 3 | 58.6 | Absent | 10 | 0.35 | Good |
| Expt. Ex. 4 | 56.3 | Absent | 10 | 0.41 | Good |
| Expt. Ex. 5 | 55.5 | Absent | 10 | 0.31 | Good |
| Expt. Ex. 6 | 62.9 | Absent | 10 | 0.27 | Good |
| Expt. Ex. 7 | 57.7 | Absent | 10 | 0.37 | Good |
| Expt. Ex. 8 | 59.0 | Absent | 10 | 0.58 | Good |
| Expt. Ex. 9 | 57.5 | Present | 10 | 0.60 | Good |

TABLE 1-continued

| | | | | | |
|---|---|---|---|---|---|
| Expt. Ex. 10 | 54.5 | Absent | 10 | 0.62 | Good |
| Expt. Ex. 11 | 55.9 | Absent | 10 | 0.65 | Good |
| Expt. Ex. 12 | 53.5 | Absent | 10 | 0.71 | Good |
| Expt. Ex. 13 | Deficient sintering | | | | |
| Expt. Ex. 14 | 55.4 | Absent | 8 | 0.92 | Chipping |
| Expt. Ex. 15 | 50.0 | Absent | 6 | 1.31 | Flaking |
| Expt. Ex. 16 | 54.9 | Present | 5 | 1.45 | Flaking |
| Expt. Ex. 17 | 57.6 | Absent | 6 | 1.45 | Flaking |
| Expt. Ex. 18 | 51.2 | Absent | 5 | 1.52 | Flaking |
| Expt. Ex. 19 | 54.0 | Absent | 6 | 1.67 | Flaking |
| Expt. Ex. 20 | 60.0 | Present | 7 | — | Abrupt fracture |
| Expt. Ex. 21 | 52.1 | Absent | 5 | 1.55 | Flaking |

(2) Mixing

The powder obtained by the above-described blending was put into a ball mill having an inner wall formed of silicon nitride, and mixed with ethanol and a pulverization medium. Silicon nitride-based ball stones having Φ6 to 10 mm were used as the pulverization medium, and the pulverization and mixture were performed for about 72 hours to produce a mixture (slurry).

(3) Drying and Granulation 3.5 wt % of an organic binder was added to the obtained mixture and the obtained product was dried with hot water, and mixed powder was obtained through a sifter having 250 μm openings.

The above-described process steps were common to the silicon nitride-based sintered bodies of all of the examples and the comparative examples.

(4) Press-Forming

The mixed powder obtained through the above-described process steps was press-formed at a pressure of 1000 kgf/cm². The obtained formed product was subjected to CIP forming at a pressure of 1500 kgf/cm² to produce a formed product.

(5) Sintering (5-1) Silicon Nitride-Based Sintered Bodies of Experimental Examples 1 to 12

For the silicon nitride-based sintered body of each of experimental examples 1 to 12, sintering was performed through the following method to obtain a silicon nitride-based sintered body.

The formed product obtained as described above was delipidated at 800° C. for 30 minutes in a nitrogen atmosphere in which the pressure was set to be reduced. In the delipidation, the temperature increase rate was 1.5° C./minute to 3.0° C./minute, and, each time the temperature was increased by 100° C. to 200° C., the temperature was maintained stepwise for 30 minutes or longer while the temperature was increased to 800° C. The delipidated formed product was sintered in a vessel formed of silicon nitride. Specifically, the first temperature increase to 1200° C. to 1400° C. was performed at the temperature increase rate of 5° C./minute to 10° C./minute in a nitrogen atmosphere at 0.01 MPa to 0.10 MPa, and, after the first temperature increase, the second temperature increase to 1650° C. to 1850° C. was performed at the temperature increase rate of 10° C./minute to 20° C./minute in a nitrogen atmosphere at 0.15 MPa to 0.40 MPa. Thereafter, the temperature was maintained for 3 to 6 hours. After the temperature was maintained for a predetermined time period, cooling was performed at a temperature decrease rate of 10° C./minute to 20° C./minute to obtain a silicon nitride-based sintered body.

(5-2) Silicon Nitride-Based Sintered Bodies of Experimental Examples 13 to 21

The silicon nitride-based sintered bodies of experimental examples 13 to 21 were obtained in the same manner as for the silicon nitride-based sintered bodies of experimental examples 1 to 11 except that sintering was performed in a manner in which a temperature was increased to 1200° C. to 1400° C. at a temperature increase rate of 5° C./minute to 10° C./minute in a nitrogen atmosphere at 0.01 MPa to 0.10 MPa, and the temperature was thereafter increased to 1650° C. to 1850° C. in a nitrogen atmosphere at 0.10 to 0.15 MPa while the temperature increase rate was maintained.

(6) Polishing

The surface of the obtained silicon nitride-based sintered body was polished into a final tool shape to obtain a cutting tool.

2. Analysis (1) X-Ray Diffraction Analysis

Figure 5:
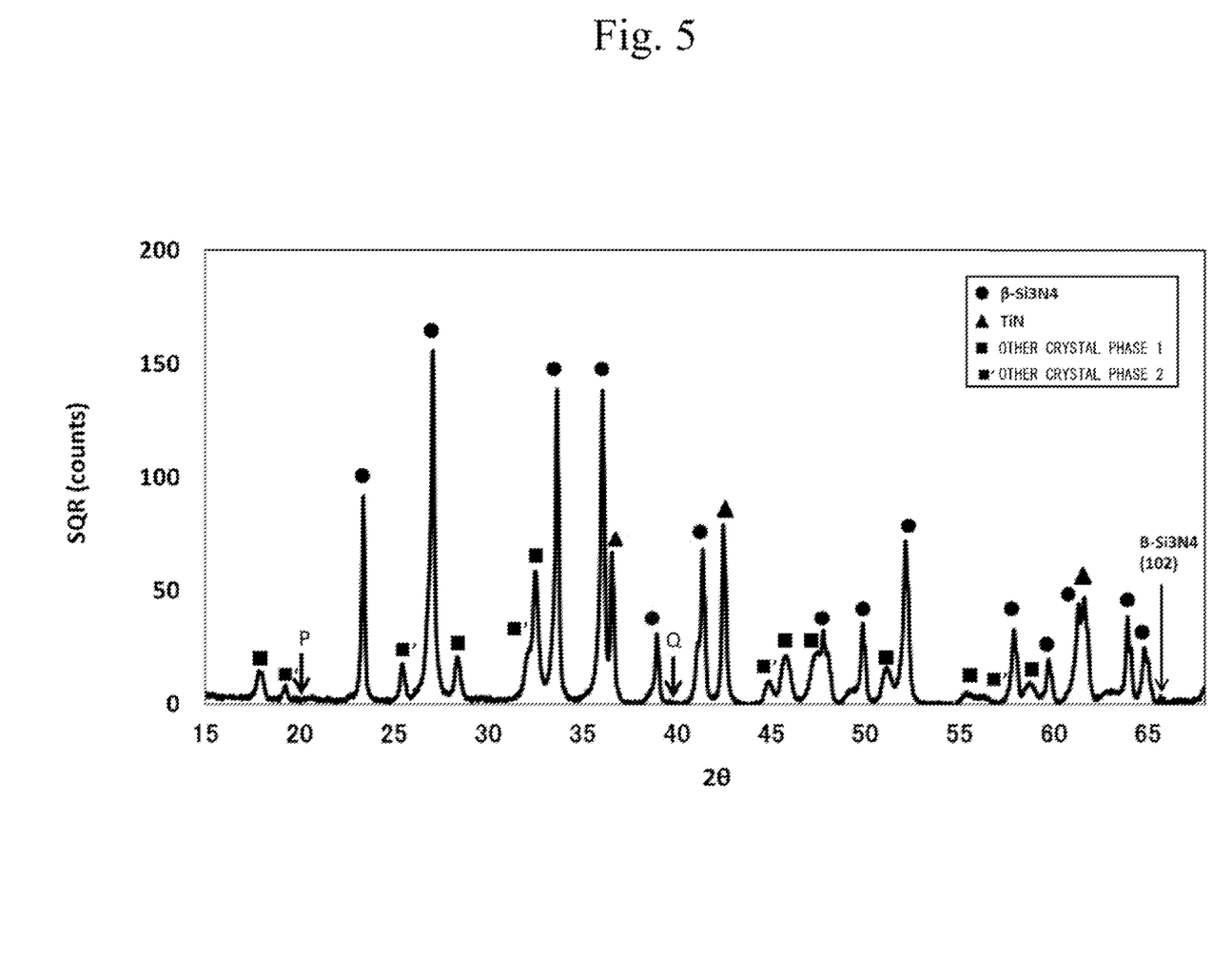
FIG. 5 Diagram illustrating an X-ray diffraction pattern in a surface region in experimental example 1.

The obtained silicon nitride-based sintered body was polished to form polished surfaces of the surface region and the internal region, and each of the polished surfaces was subjected to X-ray diffraction measurement. CuKα rays were used as an X-ray source, and the measurement was performed at 2θ ranging from 10° to 80° in the output condition of 45 kV and 200 mA. For the obtained X-ray diffraction peak, a crystal phase was identified and whether the above-described halo pattern was present or absent was determined. In the identification of the crystal phase, the X-ray diffraction peak was compared with a known crystal phase peak to identify a kind of the crystal phase. A ratio B/A of the maximum peak intensity of the crystal phase in the grain boundary phase to the maximum peak intensity of the matrix phase as described above was calculated from the maximum peak intensity of each of the identified crystal phases. In experimental example 13, sintering was deficient and the X-ray diffraction analysis was not performed. FIG. 3 shows an X-ray diffraction pattern in the internal region in experimental example 1, and FIG. 5 shows an X-ray diffraction pattern in the surface region. In FIG. 3 and FIG. 5, the horizontal axis represents a rotation angle (2θ) and the vertical axis represents a square root of the X-ray diffraction intensity.

Whether a halo pattern is present or absent in the internal region in each of the experimental examples is indicated in a cell for "Halo pattern in internal region" in Table 1. A ratio B/A of the maximum peak intensity of the crystal phase in the grain boundary phase to the maximum peak intensity of the matrix phase in each of the experimental examples is indicated in a cell for "X-ray intensity ratio (B/A)" in Table 1. In the cells for "X-ray intensity ratio (B/A)", an intensity ratio in the surface region is indicated in a cell for "Surface"

and an intensity ratio in the internal region is indicated in a cell for "Internal region". Whether a halo pattern is present or absent in the surface region in each of the experimental examples is indicated in a cell for "Halo pattern in surface region" in Table 1.

(2) SEM Observation

Furthermore, mirror-finishing treatment was performed on a cross-section passing through both the surface region and the internal region of the silicon nitride-based sintered body, and the texture was observed by a scanning electron microscope after etching. In the method described above in the embodiment, the proportions Cs, Ci of the areas occupied by the grain boundary phase were calculated and the form of the particles of the silicon nitride or Sialon was evaluated. In experimental example 13, sintering was deficient and SEM observation was not performed.

The proportions Cs, Ci of the areas occupied by the grain boundary phase in each of the experimental examples are indicated in cells for "Grain boundary phase amount (area %)" in Table 1. In the cells for "Grain boundary phase amount (area %)", the proportion Cs of the area occupied by the grain boundary phase in the surface region is indicated in a cell for "Surface", and the proportion Ci of the area occupied by the grain boundary phase in the internal region is indicated in a cell for "Internal region".

The form of particles of silicon nitride or Sialon in each of the experimental examples is indicated in a cell for "Form of silicon nitride particles" in Table 1. In the cells for "Form of silicon nitride particles", a proportion of the number of particles having the maximum diameter of not greater than 0.5 μm among the entire particles of silicon nitride or Sialon is indicated in a cell for "Proportion of particles having maximum diameter of not greater than 0.5 μm", and a proportion of the number of particles having an aspect ratio of not less than 1.5 among particles of silicon nitride or Sialon having the minimum diameter of not less than 0.5 μm is indicated in a cell for "Proportion of particles having minimum diameter of not less than 0.5 μm" and aspect ratio of not less than 1.5.

3. Production of Cutting Tool

The silicon nitride-based sintered body of each of experimental examples 1 to 12 and 14 to 21 was machined to form a tool shape (RCGX120700T01020). In experimental example 13, sintering was deficient and a cutting tool was not produced.

In Table 1, a composition (blending ratio) of the material powders of the silicon nitride-based sintered body as described above is indicated. The composition was not changed also after sintering. Therefore, the composition is the same as the composition of the ceramics sintered body. Each silicon nitride-based sintered body having been sintered was machined to obtain a cutting tool. Consequently, the composition of the material powders is the same as the composition of the cutting tool.

4. Cutting Test (1) Test Method

A cutting test was performed by using each cutting tool. The test condition was as follows.

Machining method: turning
Workpiece: Inconel 718, dimension of φ150 mm×300 mm
Cutting speed: 280 m/minute
Feed rate: 0.27 mm/rev
Cut depth: 2.0 mm
Cutting condition: wet machining
Evaluation: machining over 5.0 mm was continuously performed twice in a direction of an outer diameter end face in one cycle, and the cutting test was performed up to 10 cycles. In a case where an amount of damage to the tool cutting edge became greater than 0.8 mm, the evaluation was performed with the number of cycles in which the machining was able to be performed before the amount of damage to the tool cutting edge became 0.8 mm. In a case where fracture occurred before an amount of damage to the tool cutting edge became 0.8 mm, the evaluation was performed with the number of cycles prior to occurrence of the fracture.

Table 1 indicates the number of times the machining was performed, an amount of damage, and the state of the cutting edge under the above-described machining condition.

(2) Test Result

Table 1 indicates the test results. The amount of damage to the cutting tool of each of experimental examples 1 to 12 was less than 0.8 mm (more specifically, not greater than 0.71 mm) even at 10 cycles corresponding to the upper limit. Meanwhile, in experimental example 14, chipping occurred in the eighth cycle and the amount of damage was not less than 0.8 mm. In experimental examples 15 to 19 and 21, flaking occurred in the fifth to the sixth cycle, and the amount of damage was not less than 0.8 mm. In experimental example 20, great fracture occurred in the seventh cycle, and the amount of damage was not able to be measured. These results indicate that the cutting tool of each of experimental examples 1 to 12 had excellent fracture resistance and a long tool lifespan.

Among the cutting tools of experimental examples 1 to 12, in experimental examples 1 to 11 satisfying at least one of the requirements about the proportion of the area occupied by the grain boundary phase as described above, and the requirements about the form of particles of silicon nitride or Sialon as described above, the amount of damage was less than that in experimental example 12 that did not satisfy these two requirements. This result indicates that the cutting tool of each of experimental examples 1 to 11 had more excellent fracture resistance than that in experimental example 12.

Among the cutting tools of experimental examples 1 to 11, in experimental examples 1 to 9 satisfying both the requirements about the proportion of the area occupied by the grain boundary phase as described above and the requirements about the form of the particles of silicon nitride or Sialon as described above, there was a tendency that the amount of damage was less than those in experimental examples 10 and 11 that did not satisfy one of the two requirements. This result indicates that the cutting tool of each of experimental examples 1 to 9 had more excellent fracture resistance than those in experimental examples 10 and 11.

Among the cutting tools of experimental examples 1 to 9, in experimental examples 1 to 8 satisfying the requirements about a halo pattern in the surface region as described above, there was a tendency that the amount of damage was less than that in experimental example 9 that did not satisfy the requirements about a halo pattern in the surface region as described above. This result indicates that the cutting tool of each of experimental examples 1 to 8 had more excellent wear resistance than that in experimental example 9 and had a long lifespan. It is inferred that the halo pattern was found in the surface region in experimental example 9 because an amount of WC contained in TiN powder used for production was small.

The present invention is not limited to the embodiments described above in detail, and various modifications or variations can be made without departing from the scope of the claims of the present invention.

DESCRIPTION OF REFERENCE NUMERALS

1: cutting tool
2: silicon nitride-based sintered body
3: matrix phase
4: hard phase
10: grain boundary phase
11: glass phase
12: crystal phase

The invention claimed is:

1. A cutting tool formed of a silicon nitride-based sintered body that includes a matrix phase formed of silicon nitride or Sialon, a hard phase, and a grain boundary phase in which a glass phase and a crystal phase exist,
wherein the silicon nitride-based sintered body
contains yttrium such that a content of the yttrium is not less than 5.0 wt % and not greater than 15.0 wt % in terms of an oxide, and contains titanium nitride as the hard phase such that a content of the titanium nitride is not less than 5.0 wt % and not greater than 25.0 wt %;
in an X-ray diffraction peak of the silicon nitride-based sintered body,
a halo pattern appears at 2θ ranging from 25° to 35° in an internal region that is deep from a surface of the silicon nitride-based sintered body by a distance of greater than 1.0 mm;
wherein regarding a maximum peak intensity A of the matrix phase and a maximum peak intensity B of the crystal phase in the grain boundary phase as defined below, a ratio B/A of the maximum peak intensity B to the maximum peak intensity A
satisfies a relationship represented by Expression (1) in a surface region distant from the surface of the silicon nitride-based sintered body by 0.2 mm or less, and
satisfies a relationship represented by Expression (2) in the internal region of the silicon nitride-based sintered body, $$0.11 \leq B/A \leq 0.40 \quad \text{Expression (1)}$$

$$0.00 \leq B/A < 0.10 \quad \text{Expression (2),}$$

when the matrix phase is formed of a single kind of phase, the maximum peak intensity A is obtained as a maximum peak intensity of the phase, and, when the matrix phase is formed of a plurality of kinds of phases, the maximum peak intensity A is obtained as a sum of maximum peak intensities of the respective phases, and
when the crystal phase in the grain boundary phase is formed of a single kind of phase, the maximum peak intensity B is obtained as a maximum peak intensity of the phase, and, when the crystal phase in the grain boundary phase is formed of a plurality of kinds of phases, the maximum peak intensity B is obtained as a sum of maximum peak intensities of the respective phases; and
wherein when a cross-section of the silicon nitride-based sintered body is observed,
a proportion of a number of particles having a maximum diameter of not greater than 0.5 μm among entire particles of the silicon nitride or the Sialon is not less than 50%, and
a proportion of a number of particles having an aspect ratio of not less than 1.5 among particles, of the silicon nitride or the Sialon, having a minimum diameter of not less than 0.5 μm is not less than 55%.

2. The cutting tool according to claim 1, wherein
when a cross-section of the silicon nitride-based sintered body is observed,
in the surface region of the silicon nitride-based sintered body, a proportion Cs of an area occupied by the grain boundary phase is not less than 7.0 area % and not greater than 14.0 area % when an area of an entire visual field is 100 area %,
in the internal region of the silicon nitride-based sintered body, a proportion Ci of an area occupied by the grain boundary phase is not less than 3.0 area % and not greater than 9.0 area % when an area of an entire visual field is 100 area %, and
a relationship represented by Expression (3) is satisfied:

$$Cs > Ci \quad \text{Expression (3).}$$

3. The cutting tool according to claim 1, wherein a halo pattern does not appear at 2θ ranging from 25° to 35° in an X-ray diffraction peak of the surface region of the silicon nitride-based sintered body.

4. The cutting tool according to claim 2, wherein a halo pattern does not appear at 2θ ranging from 25° to 35° in an X-ray diffraction peak of the surface region of the silicon nitride-based sintered body.

* * * * *